June 12, 1923.  1,458,406
L. B. HARVEY
SECTIONAL AND DEMOUNTABLE RIM
Filed Aug. 16, 1920
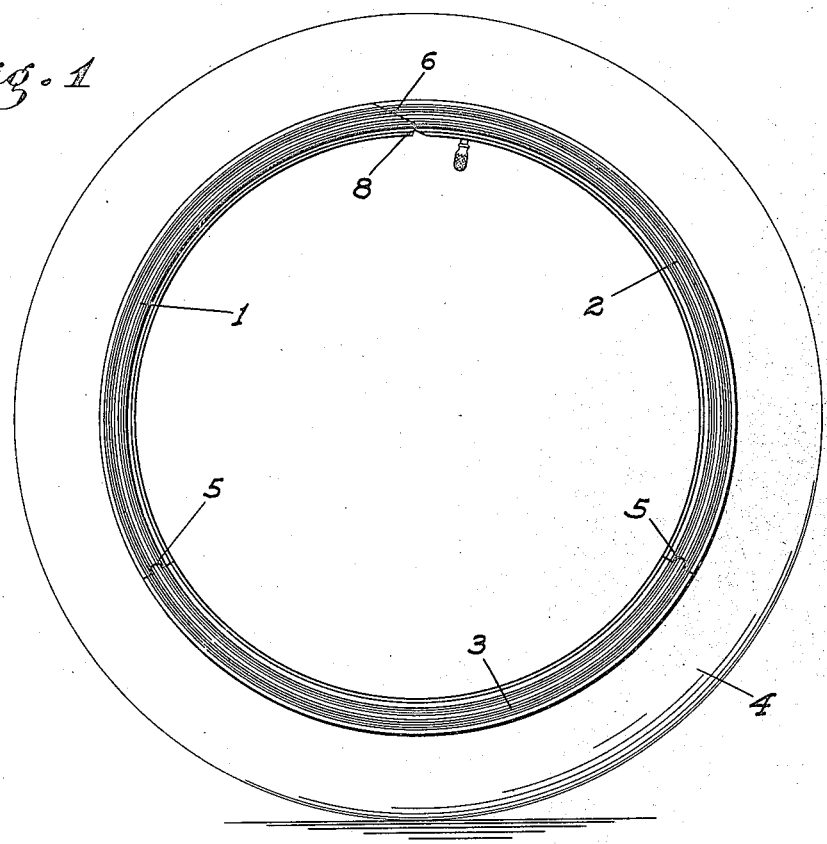
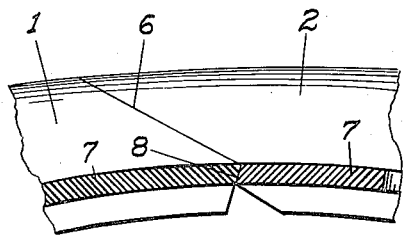
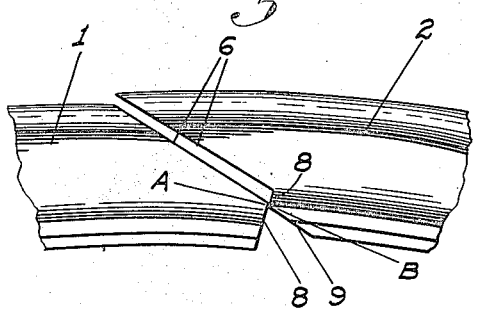
INVENTOR.
Louis B. Harvey
BY
ATTORNEY Patented June 12, 1923.

1,458,406

UNITED STATES PATENT OFFICE.

LOUIS B. HARVEY, OF BUFFALO, NEW YORK, ASSIGNOR TO HARVEY RIM AND WHEEL COMPANY, INC., OF BUFFALO, NEW YORK.

SECTIONAL AND DEMOUNTABLE RIM.

Application filed August 16, 1920. Serial No. 403,691.

*To all whom it may concern:*

Be it known that I, LOUIS B. HARVEY, a citizen of the United States of America, residing at Buffalo, county of Erie, State of New York, have invented certain new and useful Improvements in Sectional and Demountable Rims; and I do declare the following to be a full, clear, and exact description of the same, reference being had to the accompanying drawings and to the characters of reference marked thereon, which form a part of this application.

This invention relates to improvements in demountable rims for pneumatic tires, and is particularly an improvement over that form of rim shown in my copending application for patent on "sectional rim" Serial No. 284,983, filed March 25th, 1919.

The principal object is to so form the lapping ends of adjacent sections of a rim shown in the aforementioned application in such a manner that even after the rim is taken off the wheel, the said sections cannot be parted while the tire is inflated. That is, the air pressure in the tire cannot exert its force to collapse the rim, which would cause the inner tube to explode with possibly dangerous consequences.

This could be done with my former rim, and while the rim is of course not intended to be separated from the tire while the latter is inflated, some persons ignorant of possible consequences might attempt to remove the nut and locking plate previously shown prior to the deflation of the tire, with disastrous results to the tube at least, as pointed out.

Another object is to form these two section-ends that they will be firmly interlocked at this point when the tire is inflated, and also the rim is stiffened against collapse making it self locking, and eliminating need of lock nut and plate.

These objects I accomplish by means of such structure and relative arrangement of parts as will fully appear by a perusal of the following specification and claim.

In the drawings similar characters of reference indicate corresponding parts in the several views.

Fig. 1 is a side elevation of my improved rim.

Fig. 2 is a fragmentary sectional view of the interlocking section-ends.

Fig. 3 is a fragmentary elevation of a portion of the adjacent sections showing the same unlocked.

Referring now more particularly to the characters of reference on the drawings, the numerals 1, 2 and 3 denote the rim sections, which together form a complete circumference.

The said sections are shaped to receive a tire 4 in the manner shown in the application Serial No. 284,983, and the ends of sections 1 and 3, and 3 and 2 interlock with each other both against radial and lateral movement as indicated at 5 in the same manner as shown in the aforementioned application.

The abutting ends of the sections 1 and 2 are cut at an angle of about 63° as at 6 with respect to a radial line projected to the outer periphery of the rim at the point of inception of the cut, said angled cut extending from the outer periphery to the transverse band 7 of the rim sections. The line of cutting then extends to the inner periphery of the rim at an angle of about 100° to the first named line of cutting, as shown at 8. Thus male and female ends are formed, which when once placed together, cannot be forced apart as long as there is a pressure tending to hold them together, which in this case is the pressure of the inflated tire. Inasmuch as the amount which the rim sections may be spread apart is very slight, even when the tire is deflated, the inner portion 8 of the cut of the female section (in this case the member 2) is cut way somewhat as at 9 in order to shorten the length of the interlocking surfaces, which it is desired to have where it will extend the full width of the rim, that is, through the transverse band 7.

In types of rims having flanges on the inner circumference thereof, as shown for instance, in Patent Number 1307005, to Louis B. Harvey, dated June 17th, 1919, this reverse beveled or cut away portion 9 is necessary to allow the split ends to be sprung apart, and the cuts 6 being substantially parallel to the beveled cuts 9, the latter form guide surfaces for the former as the split ends are being snapped together.

In operation, when it is desired to lock the rim in place on the tire, the sections 1 and 3 and 3, and 2 are first engaged, and the abutting ends of the sections 1 and 2 then brought together as shown in Fig. 3. The sections are then drawn apart slightly so that the point "A" of section 1 will pass point "B" of section 2, after which they are moved to their contacting positions with each other, and then when the tire is inflated, the presure forces them together so that they are firmly interlocked and cannot then be spread or collapsed.

From the foregoing description, it will be readily seen that I have produced such a device as substanially fulfills the objects of the invention as set forth herein.

While this specification sets forth in detail the present and preferred construction of the device, still in practice such deviations from such detail may be resorted to and do not form a departure from the spirit of the invention, as defined by the appended claim.

Having thus described my invention, what I claim as new and useful and desire to secure by Letters Patent is:

A rim having outwardly and inwardly projecting flanges, the rim and flanges having a V-shaped transverse cut to form contiguous interlocking ends, the lower flanges, on the obtuse angle of the cut, being cut away to extend substantially parallel to the ends of the cut in the outer flanges, as and for the purpose specified.

In testimony whereof I affix my signature.

LOUIS B. HARVEY.